United States Patent [19]
Johndrow et al.

[11] 3,840,268
[45] Oct. 8, 1974

[54] VEHICLE SEATS AND TO MECHANISM THEREFOR

[75] Inventors: John Paul Johndrow, Stafford; Harold Roy Turner, Little Aston Park, both of England

[73] Assignee: H. R. Turner Willenhall Limited, Walsall, England

[22] Filed: Apr. 3, 1973

[21] Appl. No.: 347,379

[52] U.S. Cl............... 297/366, 297/367, 297/373, 16/145
[51] Int. Cl............................................. B60n 1/02
[58] Field of Search ......... 297/36, 37; 16/131, 142, 16/143, 145

[56] References Cited
UNITED STATES PATENTS

| | | | |
|---|---|---|---|
| 2,912,045 | 11/1959 | Milly | 297/363 |
| 3,079,199 | 2/1963 | Tischler | 297/367 |
| 3,185,525 | 5/1965 | Welsh | 297/367 |
| 3,309,139 | 3/1967 | Turner et al. | 297/367 |
| 3,333,891 | 8/1967 | Werner et al. | 297/367 X |
| 3,481,646 | 12/1969 | Tabor | 297/367 X |
| 3,511,534 | 5/1970 | Turner | 297/373 |

FOREIGN PATENTS OR APPLICATIONS

| | | | |
|---|---|---|---|
| 1,296,060 | 12/1962 | France | 297/367 |
| 1,162,026 | 8/1969 | Great Britain | 297/367 |

*Primary Examiner*—Paul R. Gilliam
*Assistant Examiner*—Peter A. Aschenbrenner
*Attorney, Agent, or Firm*—Marshall & Yeasting

[57] ABSTRACT

The invention provides a mechanism for holding a car seat back-rest at any of a range of positions of inclination relative to a seat cushion, using sets of teeth on the back-rest and cushion frames, a carrier controlling movement of the back-rest teeth towards and away from the cushion teeth, and a rocking cam for moving the carrier in either direction, the cam being pivoted between its ends and fast with an operating handle.

4 Claims, 7 Drawing Figures

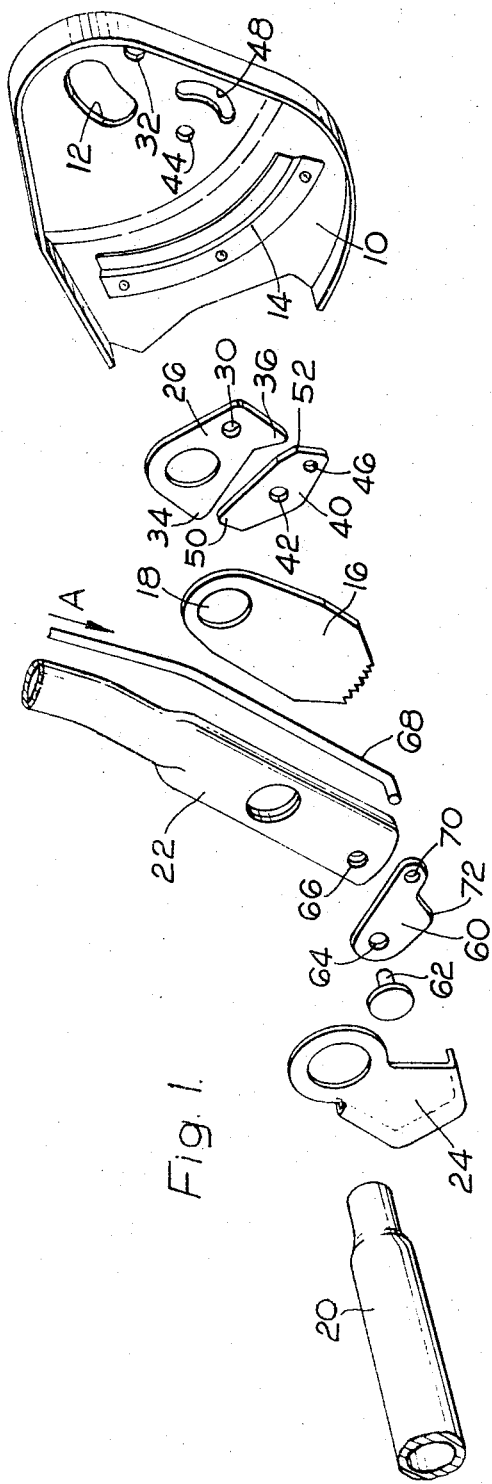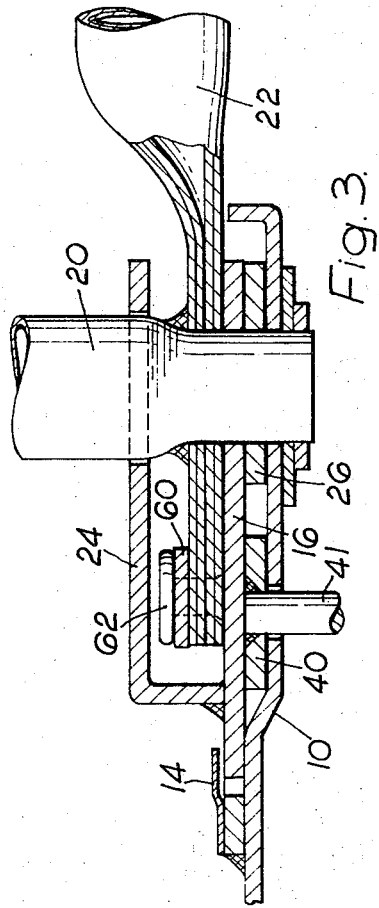

VEHICLE SEATS AND TO MECHANISM THEREFOR

BACKGROUND OF THE INVENTION

This invention relates to vehicle seats and to mechanism therefor of the kind comprising two sets of teeth which may be meshed to hold a seat back in any of a plurality of adjusted positions relative to a seat cushion, a cam for separating the teeth, and a handle or other means for turning the cam to cause disengagement of the teeth and allow such adjustment.

Seats and mechanism of this kind are well known and in widespread use.

SUMMARY OF THE INVENTION

The objects of this invention are to provide improvements which will increase the resistance to collapse in the event of accidents, whether resulting in a forwards or rearwards applied load (and some previous designs have been less satisfactory in one or other direction); simplify assembly of mechanism to seats or of seat components together; avoid play when in an adjusted position; and provide robust and reliable designs which can be manufactured cheaply.

In accordance with the invention, a seat mechanism comprises a first part provided with a fixed set of teeth, a second part pivoted for angular movement about an axis and with a second set of teeth, the second part being adapted to move transversely of that axis and relative to the fixed set of teeth in engagement therewith and disengagement therefrom, a carrier pivoted to the said first part and coupled to the second part for pivotal movement of the carrier during said transverse movement, and a cam pivoted between its ends to the first part and adapted to contact the carrier on either side of said axis according to the direction of movement of the cam, for displacing the carrier and second part in said engaging and disengaging movement.

Preferably the cam is fast with an operating handle or linkage and is spring returned to an engaged position.

The invention may be employed in seats of the kind used in two-door motor vehicles where the back-rest is arranged to be tipped forwardly to facilitate access behind the seats, and without disturbing the engagement of the teeth by utilising the back-rest inclination adjustment mechanism provided by the invention, and to this end according to a feature of the invention, the said first part may be adapted to be fixed to the seat cushion and the said second part provided with the set of teeth may be pivoted (conveniently on said axis) to the back-rest, and catch means may selectively secure and release the back-rest to the second part. When released, the back-rest can tip forwardly.

BRIEF DESCRIPTION OF THE DRAWINGS

FIG. 1 is a fragmentary exploded perspective view of the mechanism;

FIG. 3 is a section taken on the line 3—3 of FIG. 2;

DESCRIPTION OF THE PREFERRED EMBODIMENTS

Figure 2:
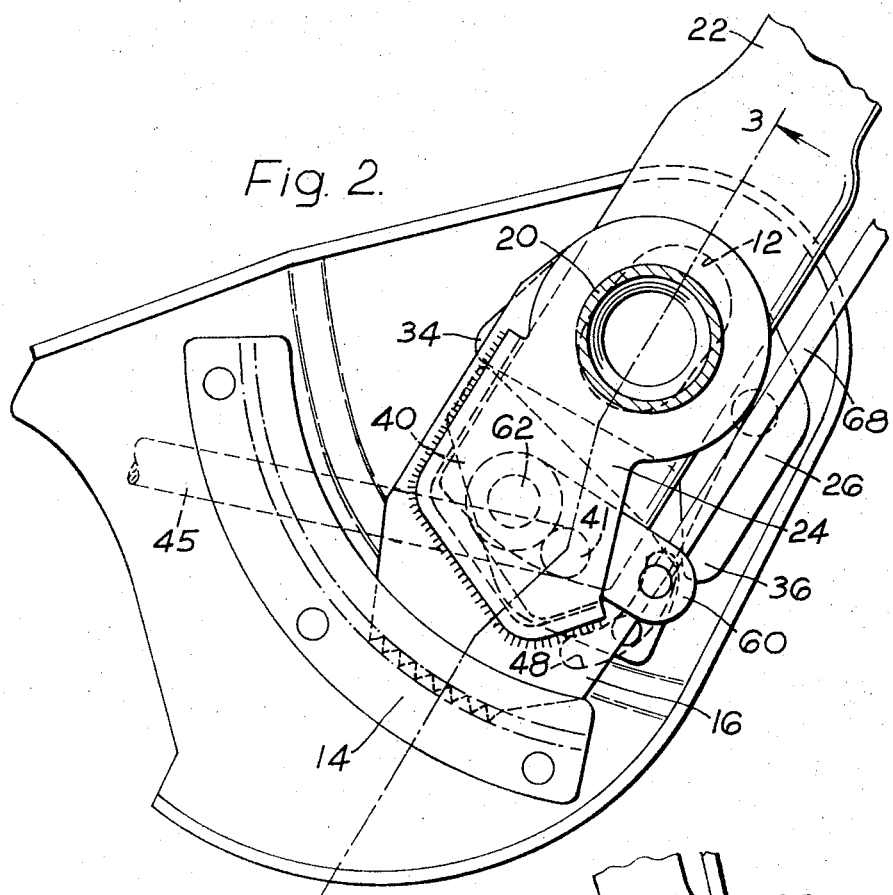
FIG. 2 is an elevation on an enlarged scale.
Figure 4:
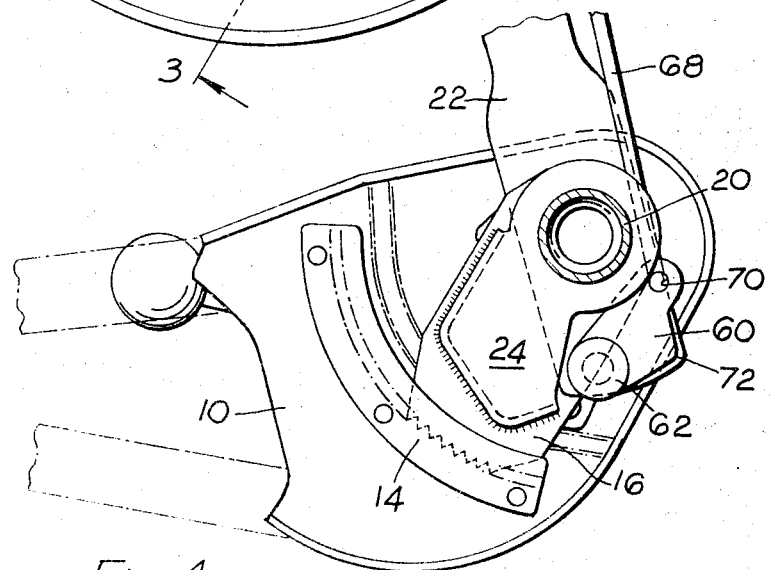
FIG. 4 is an elevation showing the tipping feature in operation.
Figure 5:
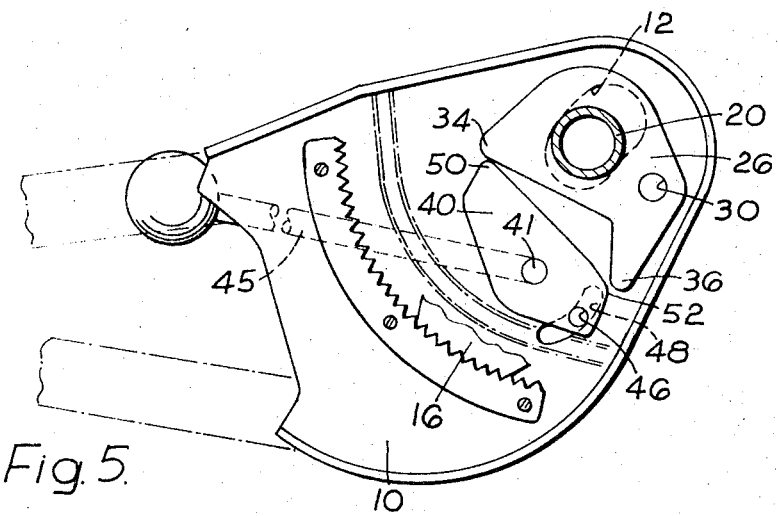
FIGS. 5 and 6 are elevations, with parts omitted and broken away for clarity, to show the inclination adjustment features in use.
Figure 6:
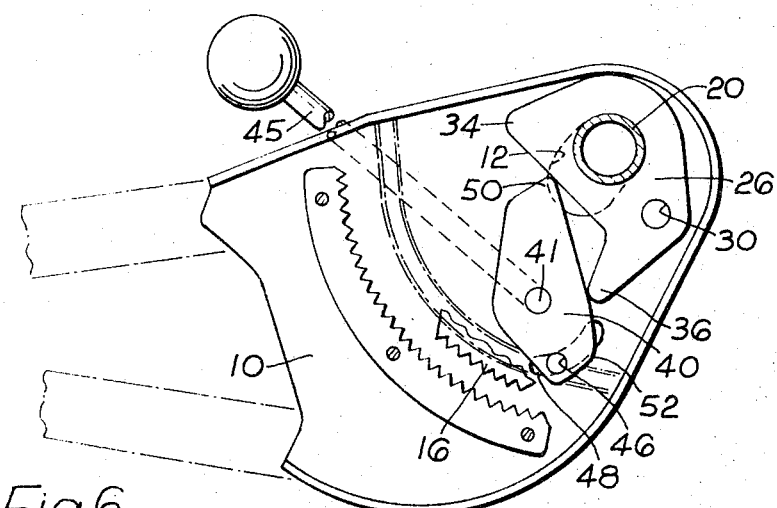

Referring now to the drawings and particularly FIGS. 1–6 thereof, the mechanism comprises a plate 10 provided with a slot 12 and with a set of teeth which are fixed to the plate, and lie within a shield plate 14, and extend arcuately about a point contained in slot 12. A second set of teeth are provided on a part 16 having a circular hole 18 in one end thereof, and this part 16 is journalled on the end of a tube 20. Fast with the tube 20 is the flattened lower end of a tube 22 forming part of the backrest frame of the seat. Also journalled on the tube 20 is a carrier plate 26. One end of the tube 20 extends through the slot 12, and is movable along the length of that slot. Hence the complete assembly of tube together with the parts which are journalled upon the tube is movable towards and away from the set of fixed teeth lying behind shield 14. When the tube 20 is in one extreme position within the slot 12, the two sets of teeth mesh and engage together (FIGS. 2 and 5). When the tube 20 is at the opposite extreme end of the slot 12, the two sets of teeth are disengaged (FIG. 6), thus allowing relative movement and hence angular adjustment of the seat back.

Carrier 26 is pivoted on a pin (not shown) engaged through holes 30 and 32, the latter being in the plate 10. Hence in movement of the tube 20 along the length of slot 12, the carrier plate swings about a pivot constituted by the axis of the pin.

The carrier plate is provided with a pair of lobes 34, 36 which provide cam abutments, and these are disposed on opposite sides of a line containing the length of the slot 12, this (imaginary) line being radial of the set of teeth which lie behind the shield 14, and substantially bi-secting the length of the latter, and also containing the axis of tube 20.

Located adjacent the carrier plate is a cam 40 which is fast with a spindle 41 extending through hole 42 in the cam, through a journalling hole 44 in the plate 10, and being secured to or integral with a lever handle 45 for turning the cam about the axis of this spindle. Conveniently the cam is provided with a second hole 46 carrying a pin which extends through a slot 48 in the plate 10and a torsion spring (not shown) wound about the spindle may have one tail engaged on the lever handle and the second tail engaged in the slot 48, so as to provide a spring force returning the cam to its FIG. 5 position after it has been angularly moved away from that position by the lever. Alternatively a tension spring may be used.

When the cam is turned in one direction, an end nose 50 of the cam contacts abutment 34 of the carrier to displace the carrier along the slot and lift the teeth 16 out of engagement with the other set of teeth. When the cam is moved in the opposite direction nose 52 thereof contacts the abutment 36 on the carrier plate to cause the reverse direction movement and re-engagement of the teeth.

The toothed part 16 lies alongside a flattened lower end of the back-rest tube 22 as mentioned, and also is fast with the housing 24. A catch pawl 60 is provided for locking the tube 22 to the housing and hence to the teeth 16, and is releasable to allow the seat back to be thrown forwardly without disengagement of the teeth.

Pawl 60 is pivoted by pin 62 engaged in holes 64, 66 and is coupled to rod 68 engaged in hole 70, and the rod terminates at a lever or trigger for example on the top of the back-rest. The rod is spring urged in the direction of arrow A, FIG. 1, or alternatively the pawl may be spring urged to like effect. The pawl seats in a corner of the catch housing 24 and holds the parts 16 and 22 together. When the rod is displaced upward, the back-rest may be tipped forward leaving the part 16 unmoved (FIG. 4). When the back-rest is returned, the heel 72 of the pawl rides over the edge of the housing 24 and the parts re-engage.

Usually an adjustable inclinably seat has a spring (not shown) urging the seat back forwardly: a torsion bar spring may be used. Such a spring is effective between the cushion frame and the back-rest, and in some conventional designs in tipping the seat back forward the spring may be overstressed. However by using this invention and anchoring the spring on the catch housing (which is therefore a preferred feature of the invention) the spring is not brought into use or stressed when the seat back is tipped as the movement is relative to the housing and hence to the spring anchorage.

Figure 7:
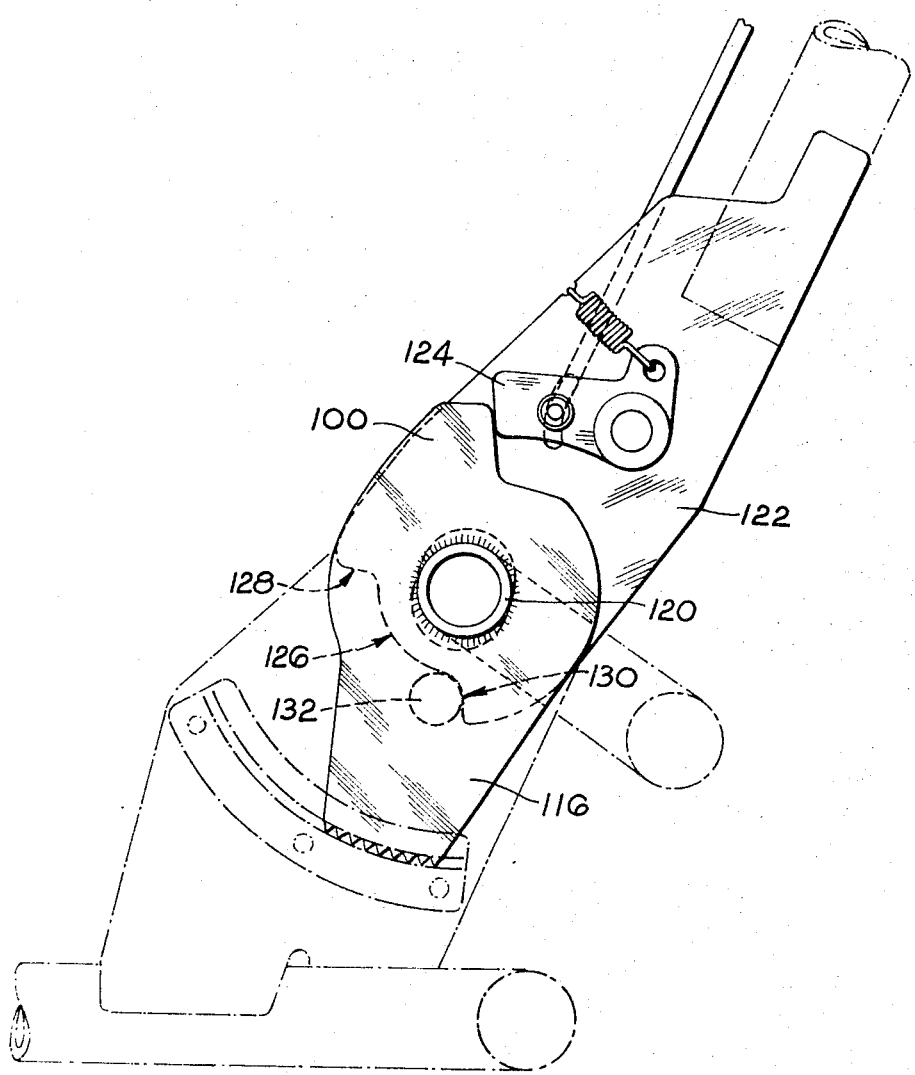
FIG. 7 is a view similar to FIG. 2 of a second embodiment.

FIG. 7 shows a modification in which for clarity only certain parts are indicated. Part 116 is fixed to tube 120 and has a lobe or lug 100 for engagement with locking catch 124, and the backrest frame terminates in plate 122 which is journalled on the tube 120 and carries the catch 124. The plate 122 has a cut-away 126 providing stops 128, 130, which engage a boss 132 on the toothed part 116. Hence, when the teeth are engaged, the backrest can be tipped by releasing catch 124 to allow the plate 122 to swing and take the opposite stop against the boss. This construction simplifies trimming of the seat.

We claim:

1. A seat mechanism comprising a first part provided with a set of teeth fixed thereon, a second part provided with a meshing set of teeth, which has limited sliding movement relative to the first part to cause the two sets of teeth to be engaged and disengaged, and which is mounted relative to the first part to permit relative pivoting of the two parts when the sets of teeth are out of engagement, a carrier pivoted to the first part, and coupled to the second part for pivoting movement of the carrier relative to the first part during said sliding movement of the second part, and a cam which is pivoted to the first part and has a two-way driving engagement with the carrier to cause the carrier to slide the second part into teeth-engaging relating with the first part upon rotation of the cam in one direction, and out of teeth-engaging relation with the first part upon rotation of the cam in the other direction.

2. A mechanism as claimed in claim 1, wherein the cam is fast with an operating handle and is spring returned to a position in which the two sets of teeth are engaged.

3. A seat mechanism as claimed in claim 1, wherein said second part is pivoted to the back-rest portion of a seat and catch means are provided for selectively securing and releasing the second part and back-rest portion from or for movement together.

4. A seat mechanism as claimed in claim 3, wherein the catch means comprises a pawl pivoted to the backrest portion and engageable with said second part.

* * * * *